(12) United States Patent
Hone

(10) Patent No.: US 6,993,802 B1
(45) Date of Patent: Feb. 7, 2006

(54) PASSENGER BOARDING BRIDGE

(75) Inventor: George Dean Hone, Roy, UT (US)

(73) Assignee: FMC Technologies, Inc., Chicago, IL (US)

( * ) Notice: Subject to any disclaimer, the term of this patent is extended or adjusted under 35 U.S.C. 154(b) by 542 days.

(21) Appl. No.: 09/711,129

(22) Filed: Nov. 12, 2000

Related U.S. Application Data

(60) Provisional application No. 60/165,251, filed on Nov. 12, 1999.

(51) Int. Cl.
   *E01D 1/00* (2006.01)
(52) U.S. Cl. .......................................... 14/71.5; 14/69.5
(58) Field of Classification Search ................. 14/69.5, 14/71.1, 71.3, 71.5, 72.5
   See application file for complete search history.

(56) References Cited

U.S. PATENT DOCUMENTS

| | | | | |
|---|---|---|---|---|
| 3,399,545 A | * | 9/1968 | Anderson et al. ............ | 14/71.5 |
| 3,747,147 A | * | 7/1973 | Weese ........................ | 14/71.1 |
| 3,808,626 A | * | 5/1974 | Magill ........................ | 14/71.1 |
| 3,843,987 A | * | 10/1974 | Lodjic ........................ | 14/71.1 |
| 3,989,157 A | * | 11/1976 | Veenema .................... | 220/4 F |
| 4,557,091 A | * | 12/1985 | Auer .......................... | 52/282 |
| 4,559,660 A | * | 12/1985 | Lichti ......................... | 14/71.5 |
| 4,620,339 A | * | 11/1986 | Shepheard .................. | 14/71.5 |
| 3,399,545 A | * | 3/1987 | Anderson et al. ............ | 14/71.5 |
| 4,715,077 A | * | 12/1987 | Shepheard .................. | 14/71.5 |
| 5,505,237 A | * | 4/1996 | Magne ....................... | 14/71.1 |
| 5,526,622 A | * | 6/1996 | Augustine .................. | 52/309.9 |
| 5,704,086 A | * | 1/1998 | Hansen et al. ............... | 14/71.5 |
| 5,711,444 A | * | 1/1998 | Meacham et al. ............. | 220/6 |
| 5,761,757 A | * | 6/1998 | Mitchell et al. ............. | 14/71.5 |
| 6,023,806 A | * | 2/2000 | Dumlao et al. ................ | 14/73 |
| 6,170,105 B1 | * | 1/2001 | Doyle et al. .................. | 14/73 |
| 6,189,269 B1 | * | 2/2001 | DeZen ...................... | 52/220.5 |
| 6,212,724 B1 | * | 4/2001 | Zhou .......................... | 14/71.5 |
| 6,309,732 B1 | * | 10/2001 | Lopez-Anido et al. ..... | 52/793.1 |
| 6,314,704 B1 | * | 11/2001 | Bryant ...................... | 52/745.7 |
| 6,381,793 B2 | * | 5/2002 | Doyle et al. .................. | 14/73 |

FOREIGN PATENT DOCUMENTS

EP    0258044 A2 *  8/1987

* cited by examiner

Primary Examiner—Thomas B. Will
Assistant Examiner—Alexandra Pechhold
(74) Attorney, Agent, or Firm—Traskbritt, P.C.

(57) ABSTRACT

An elongate covered passageway formed of modular pultruded sections adapted for use in the construction of aircraft boarding bridges is disclosed. The passageway includes a four principal structural elements, namely a floor element, two upright, spacedly positioned wall elements and a ceiling element positioned atop the two wall elements. Each of the structural elements is formed of one or more pultruded panels, each panel defining one or more compartments therein. The compartment type construction of the panels provides channels for the installation of wiring, ducting and insulation for servicing the passageway construction.

15 Claims, 14 Drawing Sheets

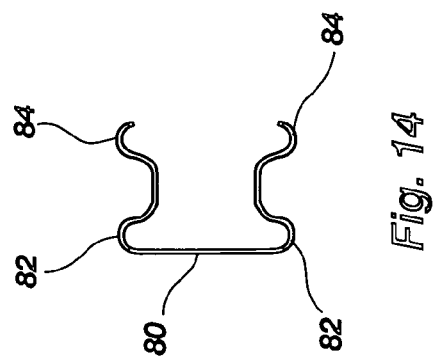
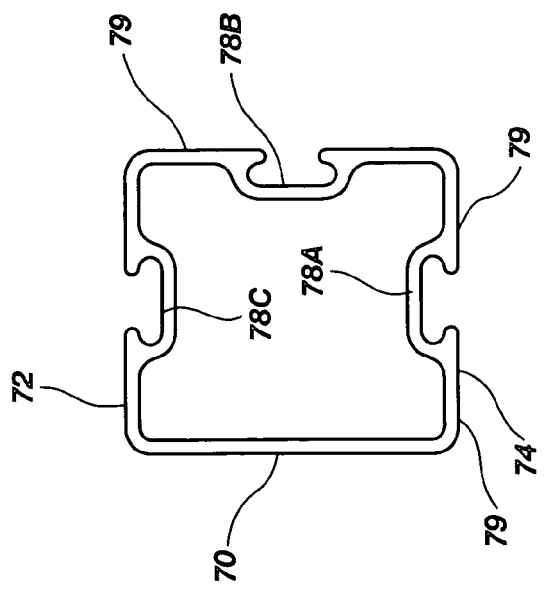
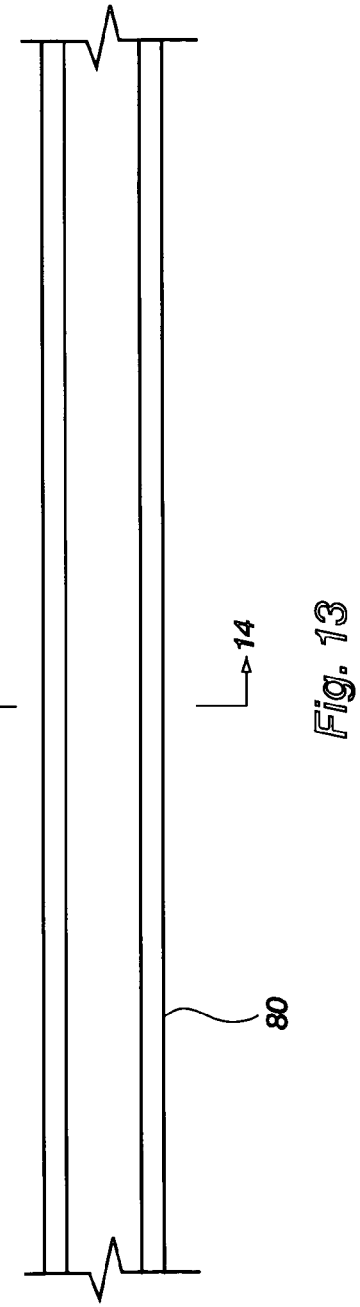

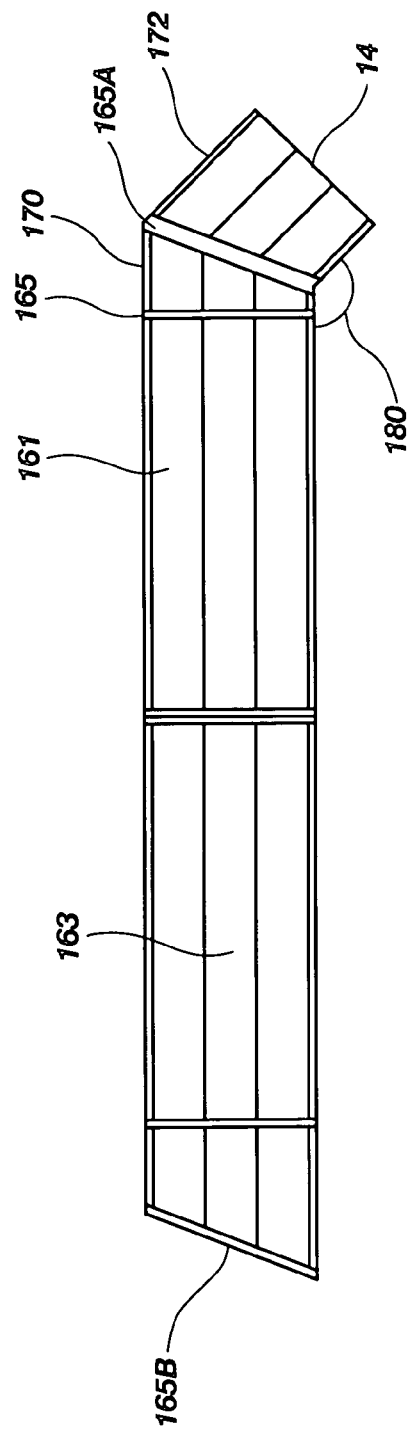
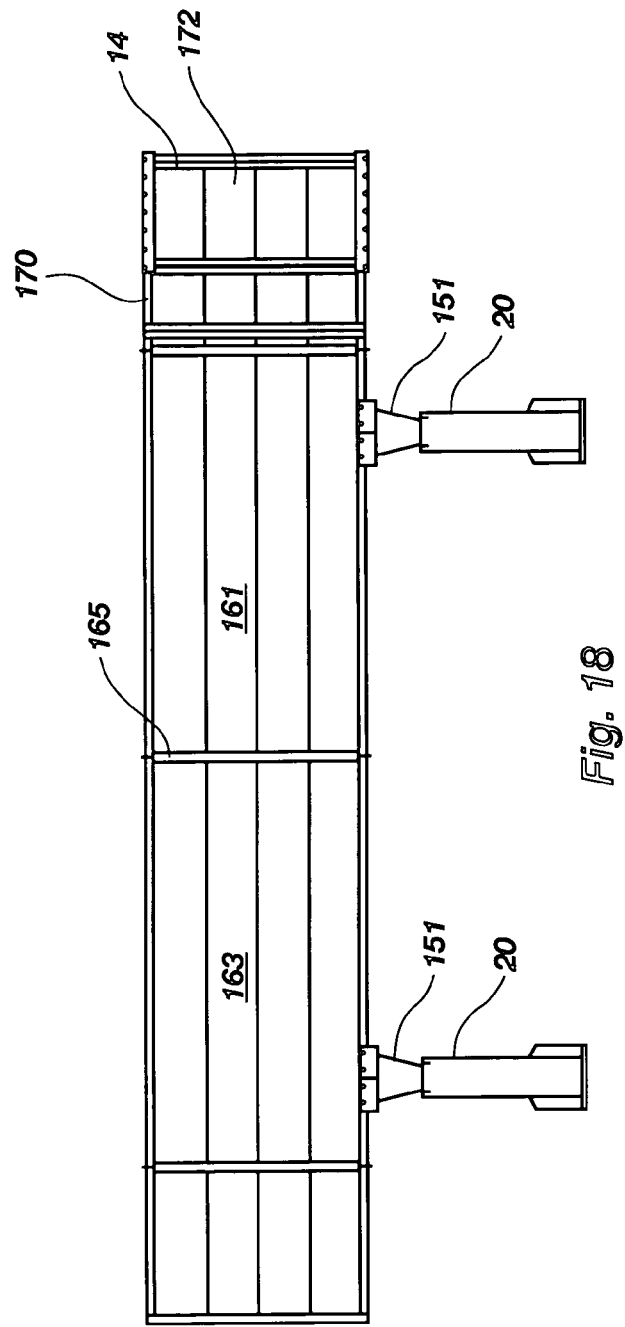

PASSENGER BOARDING BRIDGE

PRIORITY CLAIM

This application claims the benefit of U.S. provisional application 60/165,251 filed 12 Nov. 1999.

FIELD

This invention relates to bridge structures utilized to facilitate passage from one location to another. More specifically, the invention is directed to a structure for permitting passage from an airport terminal to an aircraft parked proximate thereto.

STATE OF THE ART

The use of boarding bridges for facilitating the movement of passengers and cargo from a terminal building to an aircraft parked proximate thereto is well known. Conventional airport terminal construction positions waiting areas for passengers elevationally above the airport tarmac. This positioning facilitates the use of a boarding bridge which extends outwardly from the terminal structure to a waiting aircraft parked proximate the terminal structure with oftentimes only a slight change in elevation between the floor level of the terminal and the floor level of the waiting aircraft.

Boarding bridges are typically constructed of metal, e.g., steel, aluminum. The use of metal as a construction material creates a number of maintenance concerns. Since the bridge is located outdoors and therefore subject to the weather, rust and corrosion are issues which must be constantly confronted by bridge owners.

Such bridges generally include an elongate enclosed tunnel shaped structure which interfaces with a door located in the terminal structure on a first end and a docking structure on an opposing end configured to intercooperate with the entry door of the aircraft.

In order to permit an aircraft to leave its boarding or docking position, the bridge must typically be displaced relative to the aircraft and the terminal building. Further, in order to position the bridge in proper engagement with a recently docked aircraft, the bridge must be displaced a second time. To accommodate the need to reposition the boarding bridge with the arrival and departure of each aircraft to be serviced by the bridge, various structures have been developed. Many of these structures involve a fixed bridge structure which is fixedly associated with the terminal building on a proximal end thereof. The distal end of the fixed bridge structure is interconnected to a moveable portion of the bridge which is adapted to be displaced toward and away from the aircraft sufficiently to facilitate docking with the waiting aircraft.

In a typical bridge construction, electrical power must be provided along the length of the bridge structure in order support various electrically powered apparatus, e.g., lighting, heat, air conditioning, and telephone service, as well as the drive system which is utilized to displace and control the moveable portion of the bridge. Given the conventional construction of such bridges, the wiring, duct work and related structure needed to support the utilities of the bridge have often been located on the exterior surface of the bridge. Since the bridge is located outdoors, this wiring is subjected to the elements. This results in a maintenance problem in that care must be taken to avoid the wiring deteriorating and thereby compromising the operation of the bridge.

There exists a need for an aircraft boarding bridge construction which minimizes the maintenance concerns presently experienced with metal boarding bridge constructions. Further, there exists a need for a bridge construction which addresses the need to insulate the wiring and other utility supplies of the boarding bridge from the weather.

SUMMARY OF THE INVENTION

The invention contemplates a passageway formed of a floor element and two wall elements positioned on the floor element spacedly apart from one another and extending upright from the floor element. The invention further contemplates a ceiling element positioned atop the two walls to form a covered passageway. The floor element, two wall elements and the ceiling element are preferably formed of one of more panels of composite material produced by a pultrusion process. The passageway formed by the invention is preferably used to facilitate passenger travel from the terminal to a moveable portion of the bridge which intercooperates with a distal end of the passageway. The instant passageway in conjunction with this moveable portion facilitate passenger travel from an airport terminal structure to an aircraft parked proximate to the terminal structure.

A pultruded panel employed in the instant construction may be formed in a honeycomb type structure thereby providing one or more elongate compartments or channels which extend along the length of the panel. In constructing a wall, floor or ceiling element from these panels, the panels may be positioned to define a compartment or channel which extends uninterrupted along the length of the wall, floor or ceiling. These compartments or channels may be dimensioned to receive and retain electrical wiring for servicing the various power driven apparatus within the bridge. The compartments or channels may further be utilized to receive ducting or piping for transmitting conditioned air or water along the length of the bridge for servicing the bridge or the aircraft. In yet another application, the compartments or channels may be filled or partially filled with insulation thereby controlling the heat loss to or from the interior of the bridge structure.

The use of the panels provides a construction which gives a high structural strength while also minimizing weight. The panels form modular elements which may be positioned in different orientations to produce passageway constructions which are difficult to achieve with conventional metal construction techniques. Since the composite material is highly resistant to corrosion and rust, a passageway constructed from composite panels avoids many of the problems associated with conventional metal, e.g., steel, bridge constructions. The use of a honeycomb construction also allows for the construction of a structure with a high insulation value in contrast to the high heat loss associated with conventional metal bridge constructions. As indicated above, the present bridge insulates the wiring, duct work and piping from the environment thereby avoiding the maintenance issues encountered in metal constructions where these utilities are exposed to the environment.

BRIEF DESCRIPTION OF THE ILLUSTRATED EMBODIMENTS

FIG. 12 is an end view of a corner panel connecting element;

FIG. 13 is a connecting toggle element;

FIG. 14 is an end view of the connecting toggle element of FIG. 13;

FIG. 17 is a top view of the passageway of FIG. 16;

FIG. 18 is a side view of the passageway of FIG. 16;

DETAILED DESCRIPTION OF THE ILLUSTRATED EMBODIMENTS

Figure 1:
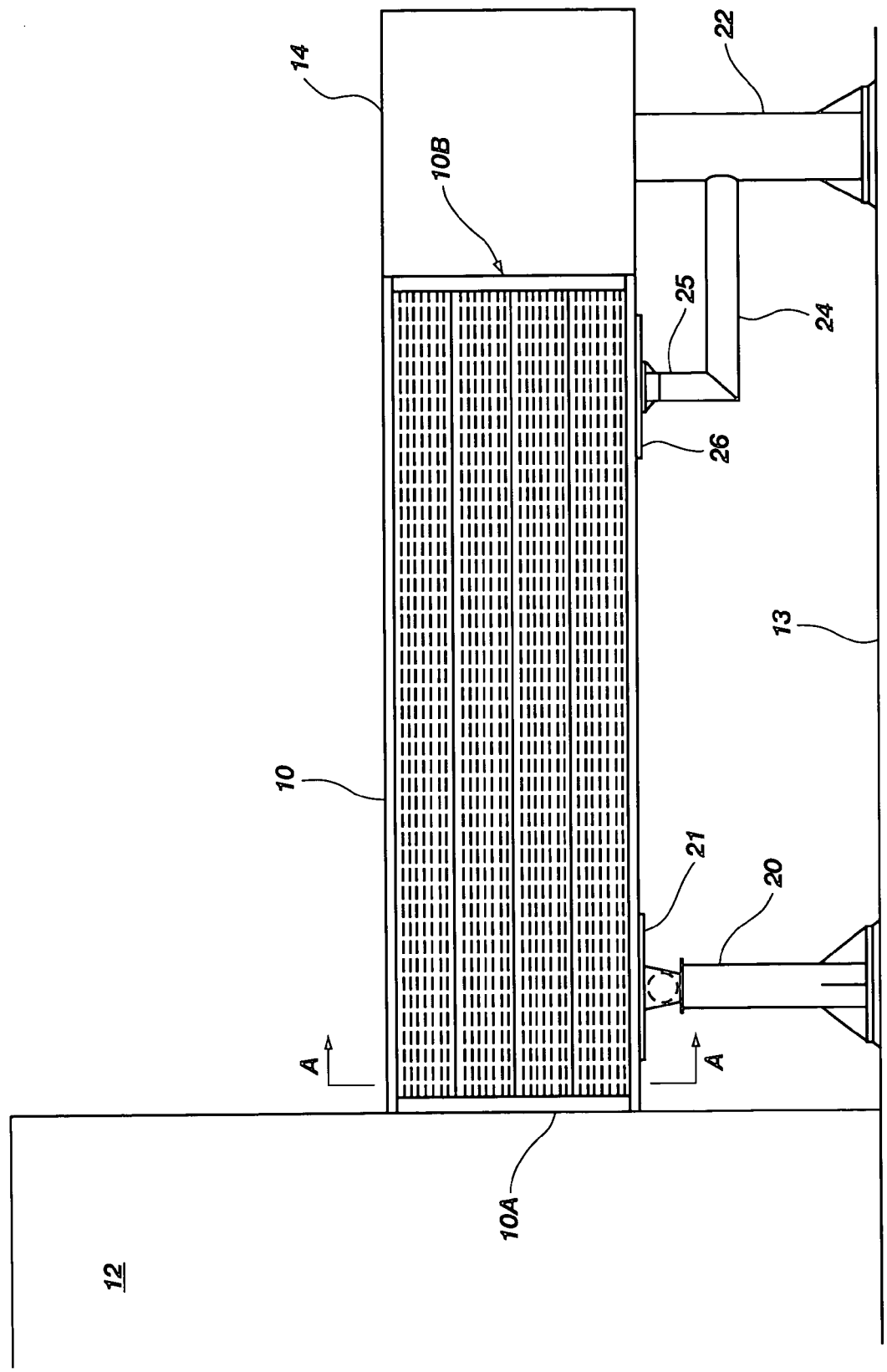
FIG. 1 is a side view of a passageway of the instant invention shown in situ with an airport terminal and a moveable boarding bridge section.

As shown in FIG. 1 a passageway 10 of the instant invention is positioned adjacent an airport terminal 12 on its proximal end 10A. The distal end 10B intercooperates with a section 14 of the passageway which is configured to intercooperate with an aircraft docked adjacent to the section 14. Various known constructions 14 are known in the art. A particular construction of section 14 is shown to advantage in FIGS. 16–18. The passageway is supported elevationally above the tarmac 13 by two support columns 20 and 22. As illustrated, the first support column 20 is shown positioned proximate the terminal 12 and is constructed to support the proximal end of the passageway. The column 20 is fitted on its uppermost end with a support plate 21 which is configured to support and intercooperate with the floor of the passageway 10.

The second support column 22 is positioned proximate the distal end 10B of the passageway to support not only the distal end of the passageway but also the section 14 of the passenger boarding bridge. The second column includes a laterally extending arm 24 which extends generally ninety degrees from the upright longitudinal axis of the column 22. Arm 24 is fitted on its outermost end with an upwardly extending second arm 25. Arm 25 is fitted on its uppermost end with a plate element 26 which is configured to engage and intercooperate with the floor of the passageway 10.

Figure 2:
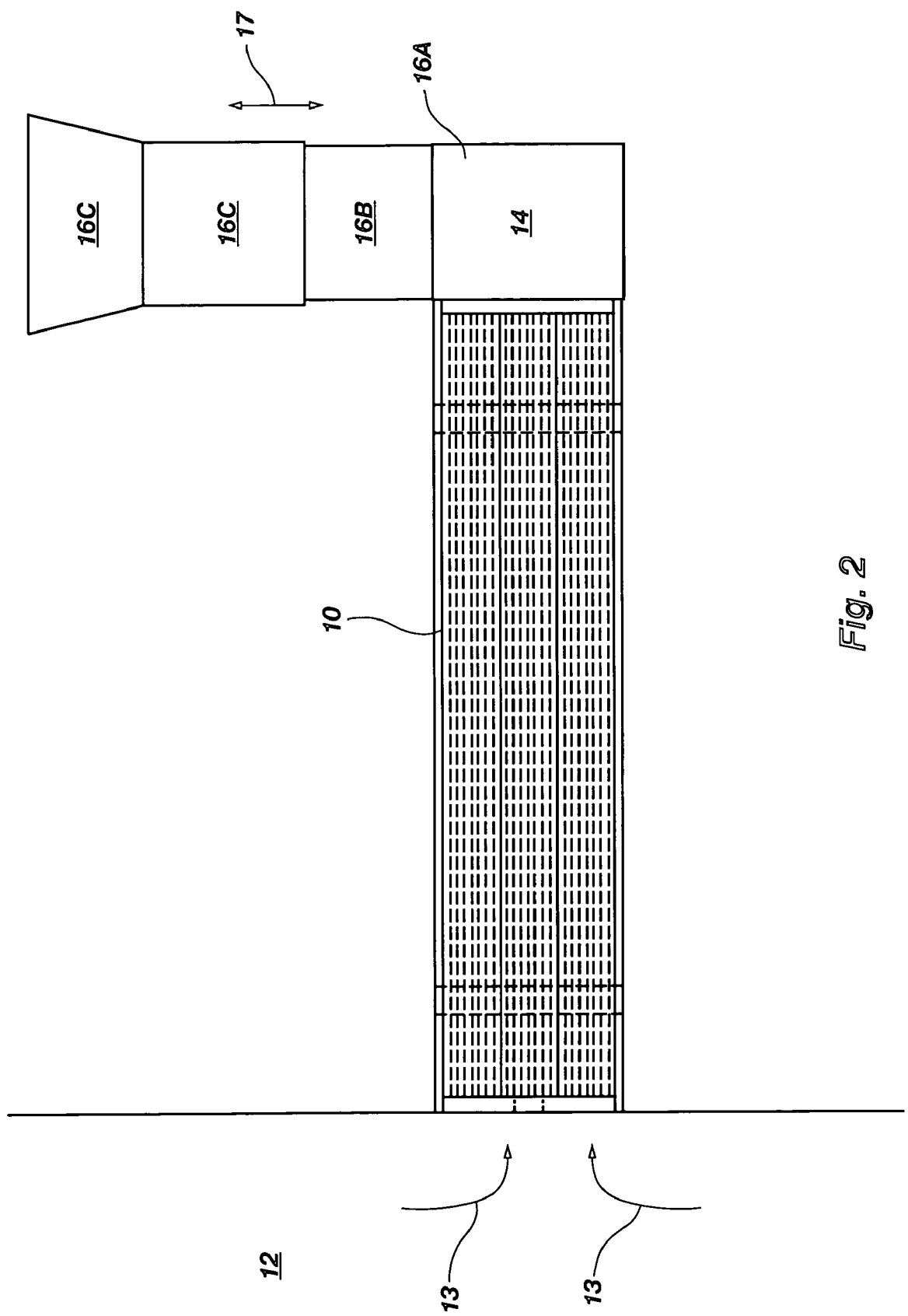
FIG. 2 is a top view of the passageway of FIG. 1.

As illustrated in FIG. 2 the section 14, of the boarding bridge construction may include a generally fixed section 16 which may be fixedly connected to the passageway 10 by means of bolts, welding or other means known in the art. Secured to the fixed section 16 is a first tunnel section 16B. Section 16B may be fixedly secured to the first section 16A along its first end. Section 16B may be formed of a plurality of planar sections arranged to form a generally rectangularly configured structure which defines a rectangularly configured cross sectioned passageway therethrough. The third section 16C is intercooperated with the second section 16B in a telescoping arrangement whereby the section 16C may move back and forth in the direction indicated by arrow 17.

By displacing the section 16C away from the section 16A the length of the passageway through the sections 16 is elongated outwardly. By moving the section 16C toward the section 16A the length of the passageway is shortened. The section 16C also defines a passageway therethrough similar in configuration to that previously described for section 16B. The outermost end of the section 16C is fitted with a structure adapted to engage the fuselage sidewall of an aircraft and form a detachable connection therewith. Various constructions of such a structure are known in the art.

Figure 3:
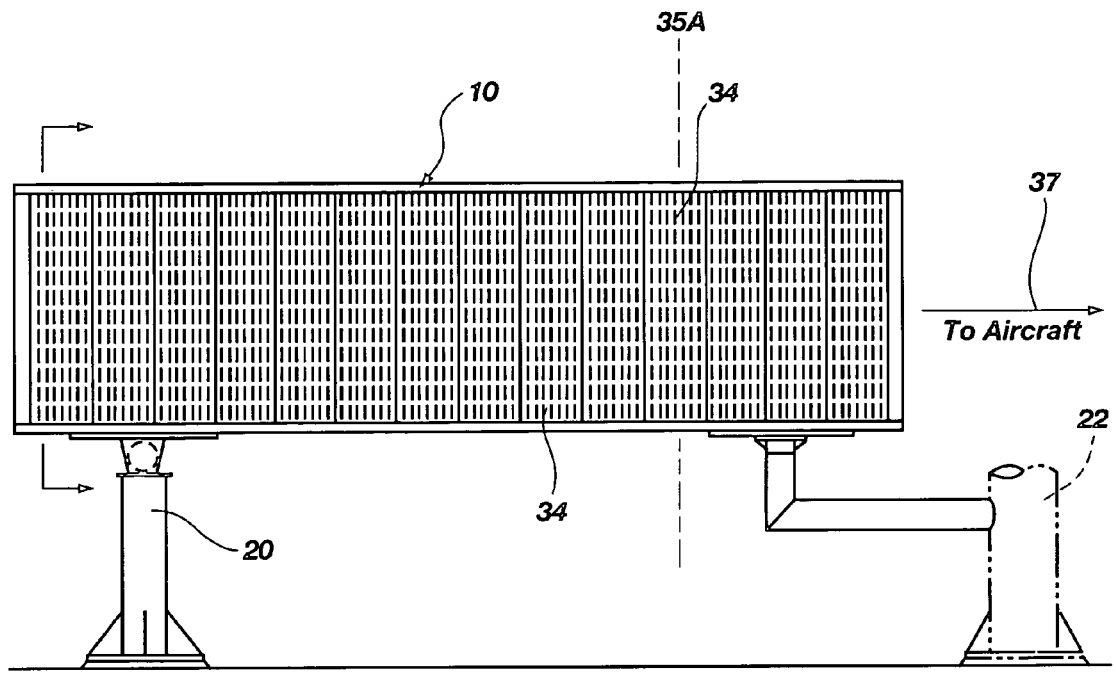
FIG. 3 is a side view of a passageway of the invention shown in isolation.
Figure 4:
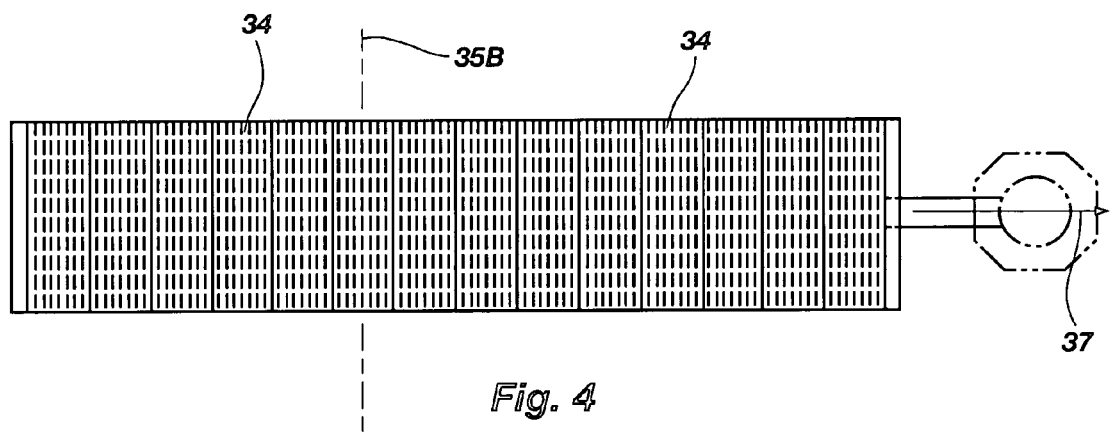
FIG. 4 is a top view of the passageway of FIG. 3.
Figure 5:
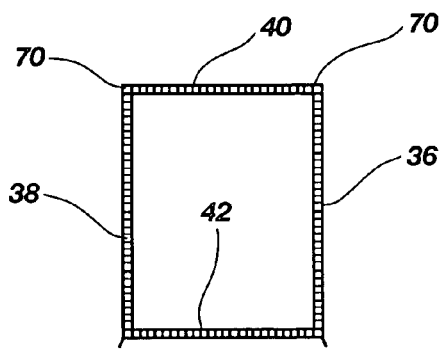
FIG. 5 is a cross sectional view of the passageway of FIG. 3 taken along section lines 5—5.

As shown to advantage in FIGS. 3–5, a passageway of the instant invention is formed of a planar floor element 42, two upstanding wall elements 36 and 38 interconnected with the floor element 42 and a ceiling element 40 positioned atop the two wall elements 36 and 38'. As shown in FIG. 5 each of the elements is generally planar in configuration. The assembly of the various structural elements, in a preferred construction, produces a generally box shaped structure having the rectangular cross section shown in FIG. 5.

The floor, wall and ceiling elements are each constructed using a plurality of modular panel elements 34. These elements are constructed of a composite material which has been formed into a panel configuration by a pultrusion process. These panels may be constructed using composite materials. Preferred composite materials include fibers selected from glass, aramid, carbon, polyethylene and boron. Preferred constructions utilize fiber reinforced polymers composites such as those obtainable from Creative Pultrusions Inc. of Alum Bank, Pa.; Superdeck Ad'Tech Systems Research Inc. of Beavercreek, Ohio and Kress Precision Composites of Pensacola, Fla. Selection of an individual fiber material is in large part determined by the particular design requirements of the passageway. Considerations of impact resistance, strength to unit of weight considerations, cost and stiffness are just a few of the considerations which may make one material more advisable than another under a given set of design requirements.

Figure 9:
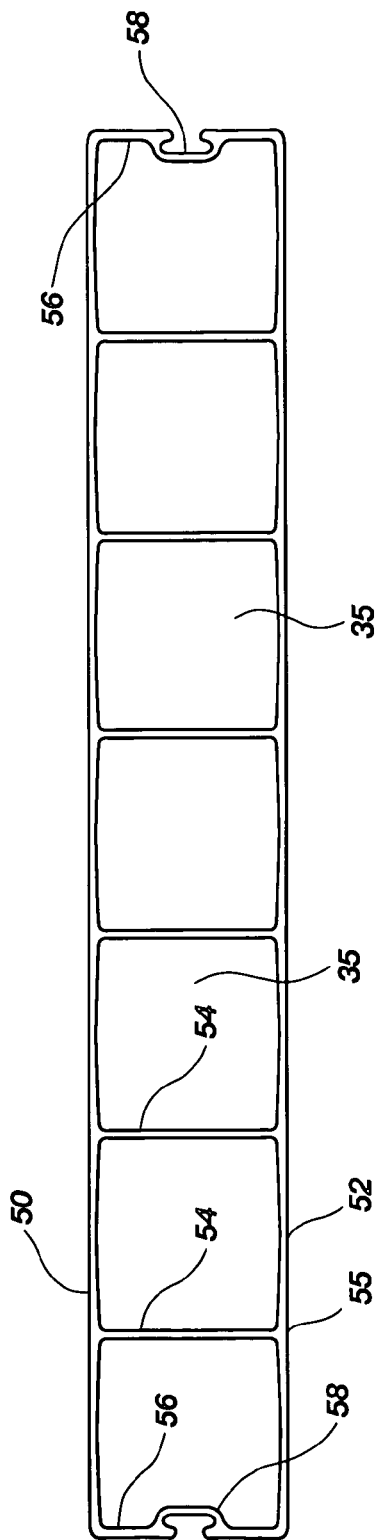
FIG. 9 is a cross sectional view of a composite panel as utilized in the construction of the instant passageway.
Figure 11:
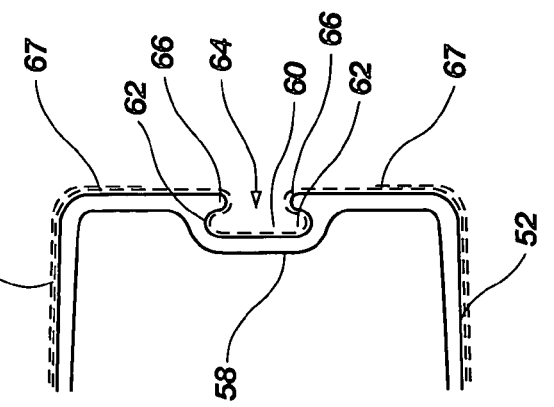
FIG. 11 is a further sectional view of a portion of the panel of FIG. 9.
Figure 10:
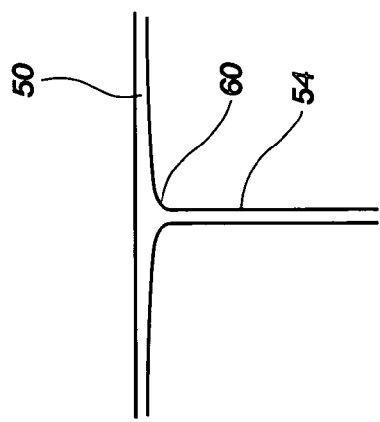
FIG. 10 is a sectional view of a portion of the panel of FIG. 9.

The individual panels may be constructed in a honeycomb type of structure of the type shown in FIG. 9. In this particular construction a panel 34 includes a flat planar upper panel 50 and a flat, planar lower panel 52. The two panels 50 and 52 are positioned spacedly apart from one another and are oriented generally parallel to one another. A plurality of spacer members 54 extend between the two panels 50 and 52 to interconnect the two panels to one another. The spacer members 54 are secured to the panel 50 on a first end and to the panel member 52 on an opposing second end. In preferred constructions, the spacer members 54 are formed integrally with the panels 50 and 52 through means of a pultrusion process. As shown in FIG. 10, the juncture of an end of a spacer member 54 with a panel 50 (or a panel 52) includes a web or fillet 60 which is positioned to add additional strength to the juncture.

Each sidewall of the panel 34 may define a slot 58. The slot is configured and dimensioned to intercooperate with a toggle connector 80. The slot 58 defines an inner recess 60 having a somewhat oblong configuration when viewed from the end of the panel. The opposing ends of the recess are generally semicircular in configuration. A pair of ears 66 extend toward one another at the mouth of the recess to define an inlet into the recess.

The toggle connector 80 is shown to advantage in FIGS. 13 and 14. As shown the connector is an elongate member having a cross section dimensioned to substantially duplicate the internal shape and configuration of the recess 60. The connector includes a pair of outwardly extending ears or extensions 82 which are configured to be received in the ends 62 of the recess 60. The free ends 84 of the connector are also configured to be received in the recess formed in the edge of a panel 34. The connector may be used to interconnect two panels 34 in an side to side or end to end construction. In practice, the two panels are positioned adjacent to one another in a coplanar orientation thereby positioning the respective recesses 60 of each panel directly opposite one another. The toggle connector 80 is then slid into the two recesses 60 from one end of the two panel arrangement. As the connector slids into the void formed by the two recesses, the connector forms a linkage structure which interconnects the two panels 34. In order to obtain a more rigid connection of the two panels, an adhesive, e.g., an epoxy adhesive, may be applied to the interior walls of the recesses and/or along the length of the connector 80 prior to the insertion of the connector into the combined recesses. Furthermore, the adhesive may be applied along the end surfaces 67 of the two panels to thereby produce a bond between the opposing surfaces 67 of the two panels.

It should be appreciated that the modular construction of the panels 34 and the ability to effect a quick, yet strong interconnection of the panels one to another, facilitates the construction of the instant passageway on site. It follows that the necessary modular components may be shipped to a job site in an unassembled condition and thereafter may be assembled on site. Understandably, this reduces the problems with shipping a large preassembled passageway from a manufacture plant to the intended use site.

FIG. 12 illustrates a corner element 70 which may be utilized to form ninety degree corners in a structure. The element 70 may also be utilized to form a "T" shaped wall structure by utilizing all three of the recesses 78. The corner element 70 may be interconnected to a first panel in a manner similar to the method discussed above relative to the interconnection of two panels to one another, i.e., the corner element is positioned adjacent a first panel in a coplanar orientation thereby aligning the recess 60 of the panel with the appropriate recess 78 of the element 70. Adhesive may then be applied on the end surfaces 67 and 79. Adhesive may be further applied to the interior sidewalls of the recesses 60 and 78. The toggle connector 80 may then be inserted into the two adjacently positioned recesses to form a bond between the panel and the corner element. Subsequently, a second panel 34 may be secured to another side of the corner element 80 by following the same procedure. As shown in FIG. 5, the corner elements 70 are positioned at each of the four corners of the passageway 10 in order to produce the rectangularly shaped cross section.

The arrangement of the spacers 54 in conjunction with the panels 50 and 52 define a plurality of voids 35. These voids typically extend through the complete length of a panel, intercommunicating with the opposing ends or sides of the panel. These voids may be viewed as forming channels through the length of the panel 34. The structure of the panel may be adjusted to dimension these voids to receive and retain the wiring of the passageway, the duct work for the air conditioning or heating system of the passageway as well as the plumbing piping of the passageway. Furthermore, these voids may be used as a means of providing a passageway for any wiring, duct work or plumbing utilities to the aircraft. The dimensions of the voids may also be adapted to permit the installation of insulation for purposes of reducing heat loss to or from the passageway.

Various orientations of the panels to form the wall, floor and ceiling elements is within contemplation. As shown in FIG. 3, a first embodiment of the invention utilizes a placement of the panels wherein the longitudinal axis 35A of the various panels is oriented generally orthogonal to the longitudinal axis 37 of the element formed by the assembly of the panels. Stated otherwise, the longitudinal axis of each panel is oriented orthogonal to the element, e.g., wall, floor, or ceiling, formed by the assembly of panels.

Figure 6:
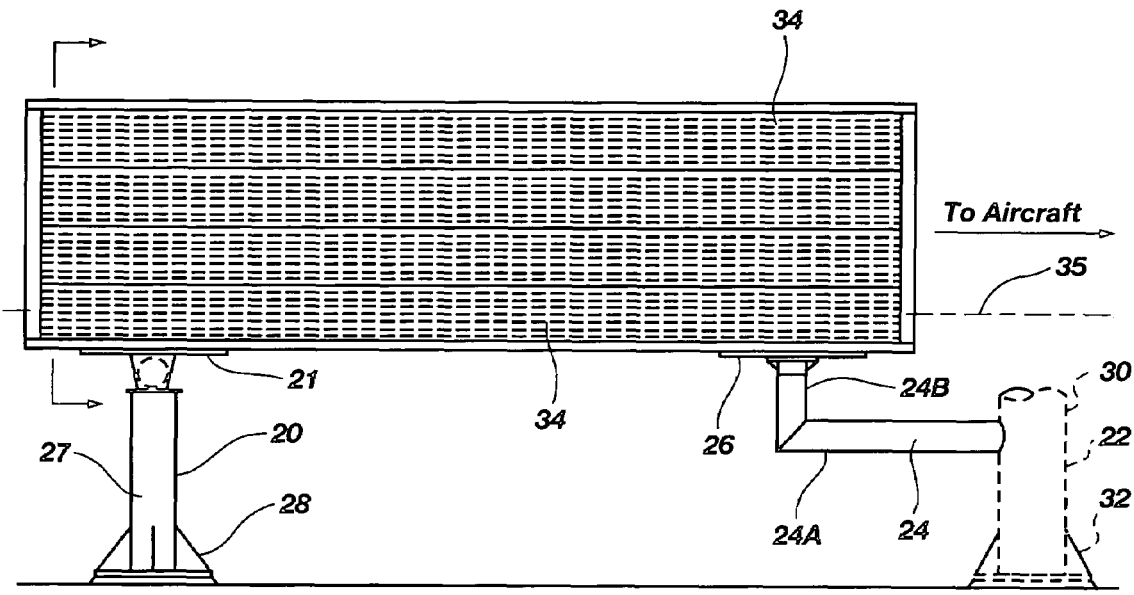
FIG. 6 is a side view of an alternative embodiment of the passageway of FIG. 3.
Figure 7:
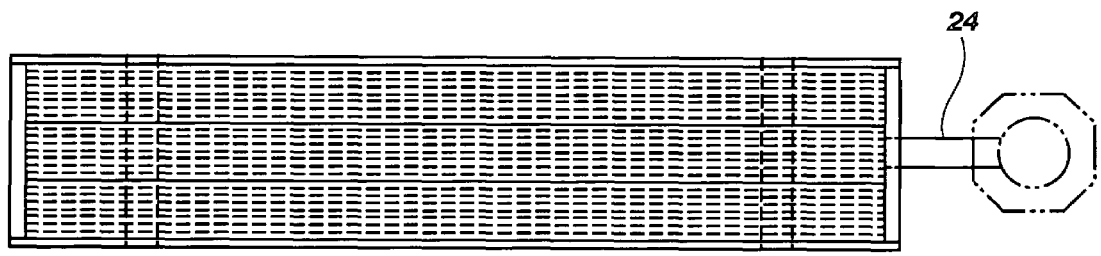
FIG. 7 is a top view of the passageway of FIG. 6.
Figure 8:
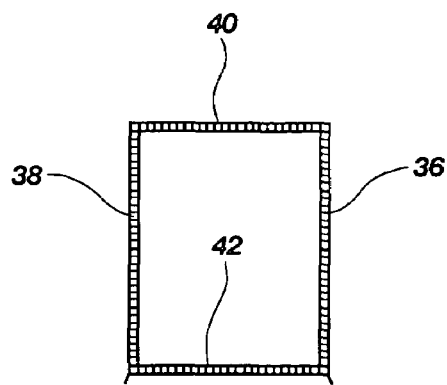
FIG. 8 is a cross sectional view of the passageway of FIG. 6 taken along section line 6—6.

FIGS. 6–8 illustrate a construction wherein the longitudinal axis of each panel is oriented parallel to the longitudinal axis of the element being formed by the conjoined panels.

The particular orientation of the panels is determined by the particular design requirements of the passageway being constructed.

Figure 15:
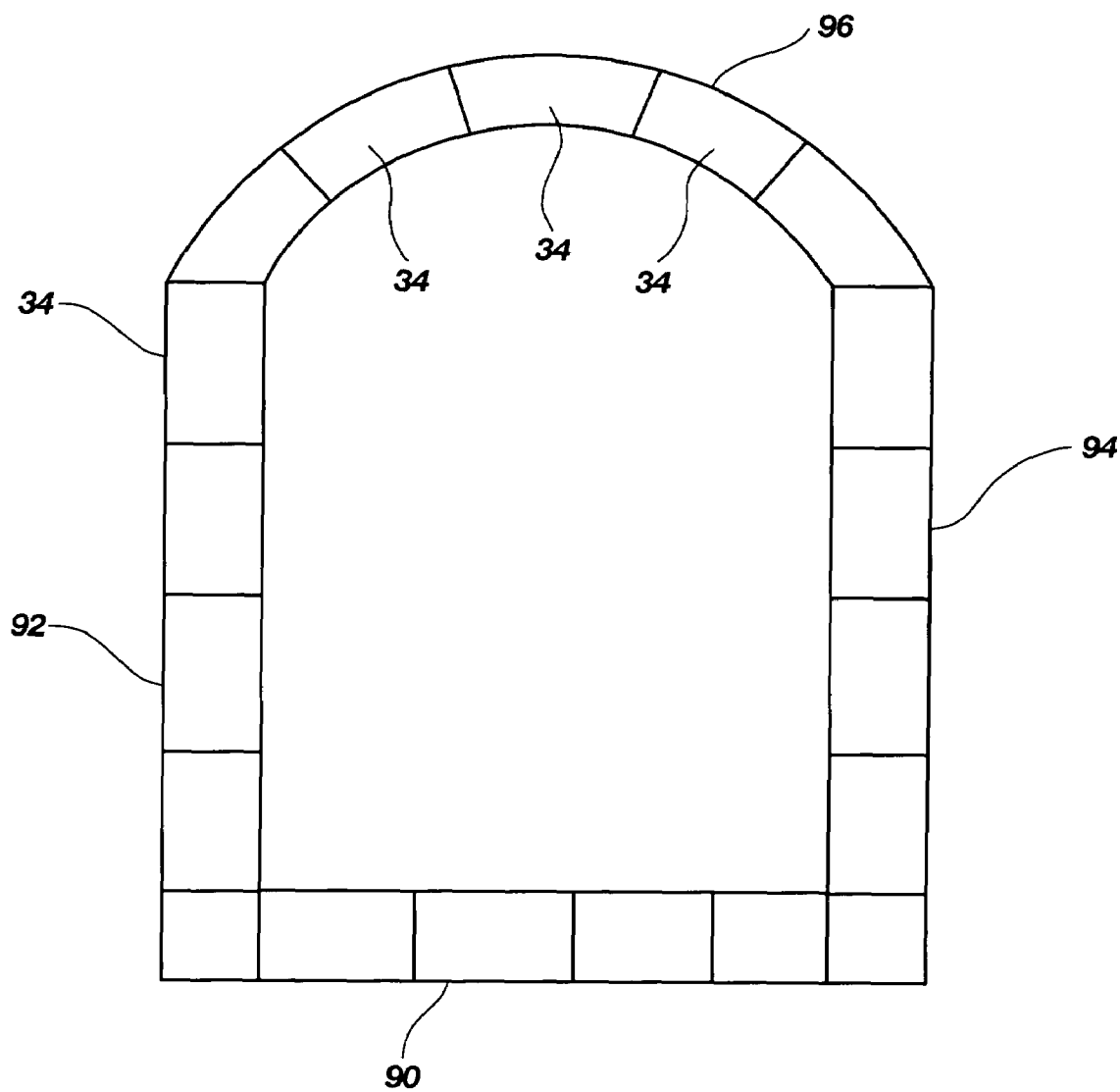
FIG. 15 is an end view of a second alternative passageway construction of the invention

The use of the instant panels 34 permit the construction of various passageway configurations. For example, FIG. 15 illustrates a passageway wherein the ceiling or roof of the passageway is formed by the positioning of the panels 34 in a nonplanar orientation.

FIGS. 16–25 illustrate an alternative embodiment of the passageway of the invention. In this particular constriction, smaller modular passageway segments are constructed and thereafter are interconnected one to another to form a total passageway construction having the desired length. As shown the passageway is constructed from a plurality of modular segments or sections 101 which are interconnected to one another end to end to form a continuous passageway.

Figure 16:
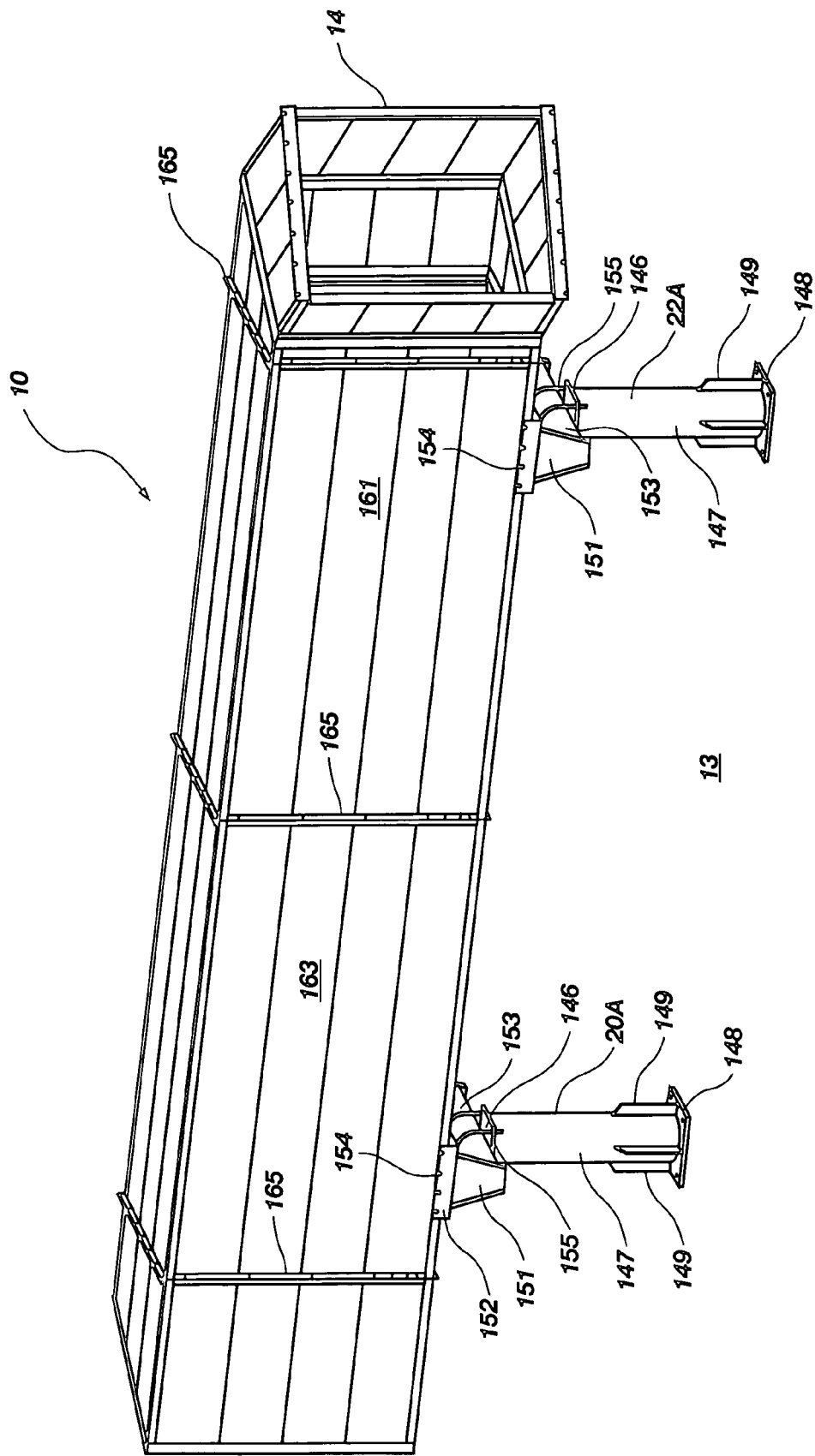
FIG. 16 is a perspective view of a third embodiment of the passageway construction.

The sections 101 are constructed consistent with the passageway constructions described above, i.e. they are formed of a floor, two upstanding sidewalls and a roof or ceiling. Each of these elements is constructed by interconnecting a plurality of elongate pultruded elements. The pultruded elements are connected to one another as shown in FIG. 16 along their respective sides to form side elements, floor elements and ceiling elements. In turn, the wall elements are interconnected to the floor elements by adhering the bottom sidewall of the lowermost pultruded panel of each wall element to the upper surface of a respective floor element. Similarly, the wall elements are interconnected to a ceiling element by adhering the upper sidewall of the uppermost pultruded panel of each wall element to the lower surface of a respective ceiling element.

The various panels are adhered to one another utilizing conventional adhesives known in the art which have been developed for use with the particular constituent material from which the pultrusion panels have been fabricated.

FIG. 16 illustrates an alternative support system for use with the passageway of the invention. As shown the passageway is supported by a plurality of upstanding supports identified as supports 20A and 22A. The main structure of these supports includes a plurality of outwardly extending laterally extending secondary supports 149 which are conjoined at their lower ends to a base plate 148. Each of the secondary supports is connected to the main support 147 along an upstanding edge thereof. Positioned on the top end of each main support 147 and secured thereto is a horizontally oriented support plate 146. The support plate 146 has a planar upper surface and defines a plurality of apertures therein which extend through the thickness of the support plate. A cylindrical tubular support element 153 is positioned on the upper surface of the support plate 146 to extend laterally across the surface of the support plate. A pair of inverted "U"-shaped connection members 155 are positioned over the support element 153. The ends of the connection members 155 extend through the apertures in the support plate 146 and are fitted with nuts or other connection structure for purposes of securing the connection members 155 against the support element 153 and the support plate 146 thereby securing the support plate and the tubular support together.

Secured to each end of the tubular support 153 is an upstanding connection plate 151. Each connection plate 151 is fitted on its upper end with a connection plate 152. Each connection plate 152 is interconnected to its module by means of engagement elements, e.g. rivets, bolts, screws.

Figure 19:
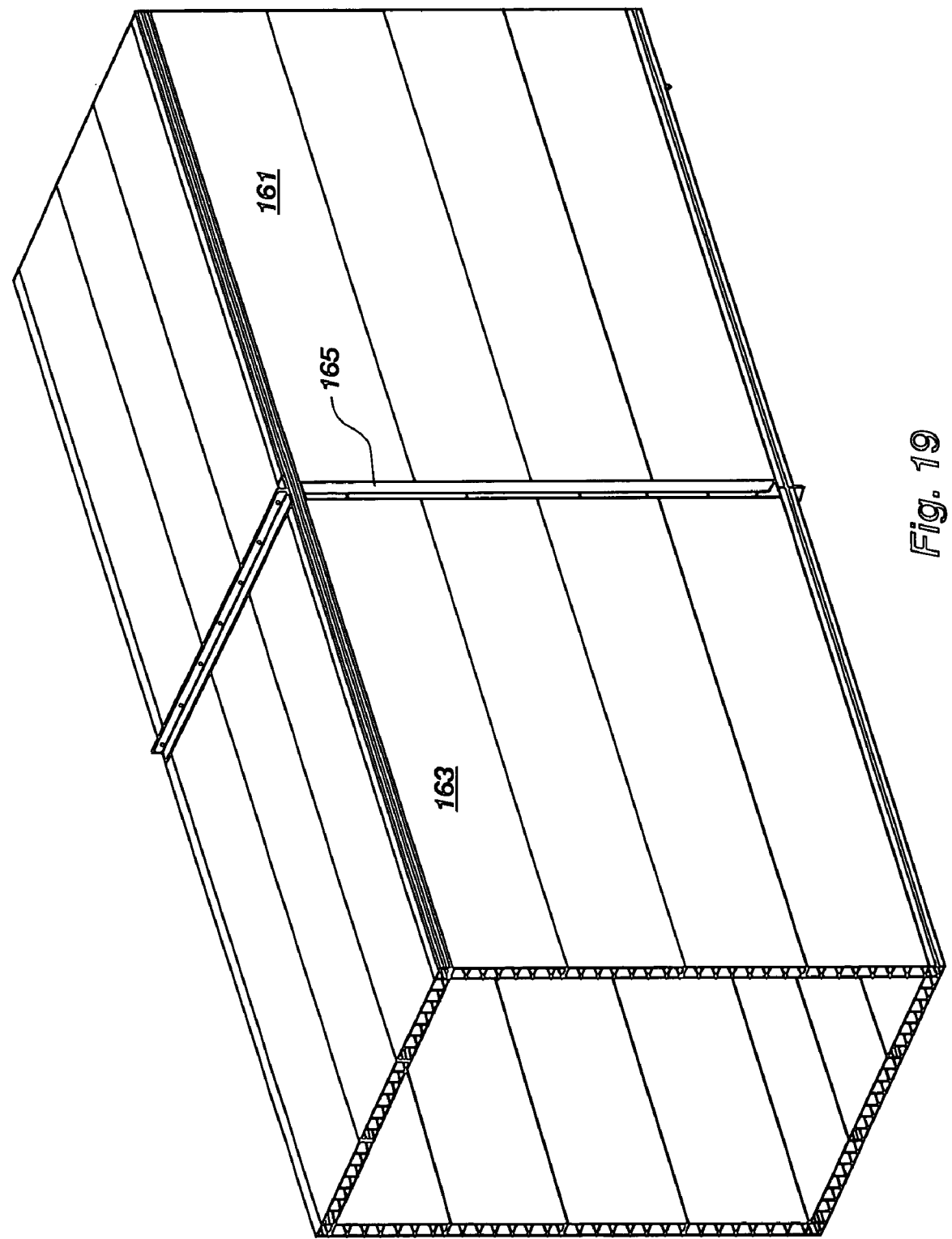
FIG. 19 is a perspective view of a section of the passageway of FIG. 16.
Figure 20:
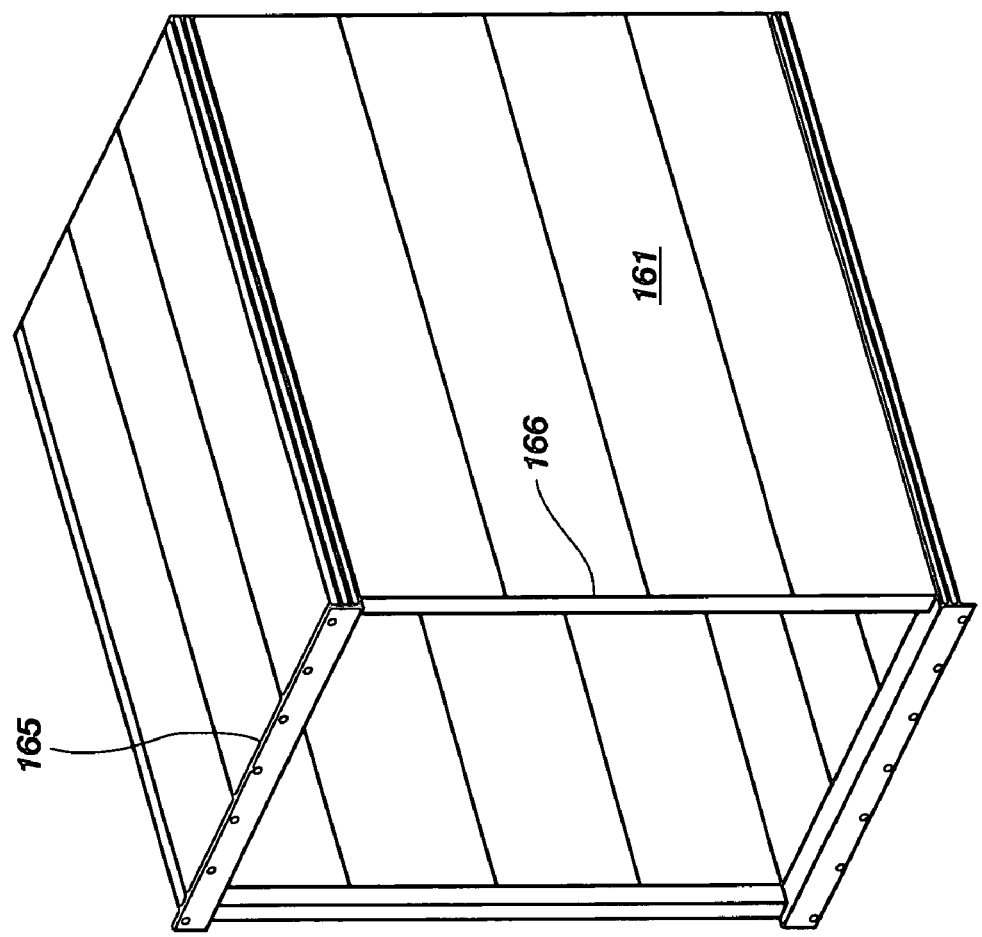
FIG. 20 is a perspective view of another section of the passageway of FIG. 16.

Each module may be interconnected to a second module positioned adjacent the end of the module by means of a connection structure 165 as shown in FIG. 19. As illustrated, this connection structure 165 is interposed intermediate the ends of the two modules 163 and 161 and extends essentially about the perimeter of the adjoining ends of the two conjoined modules. FIG. 20 illustrates a portion 166 of the connection structure 165 in more detail. As shown the connection structure 165 includes a frame like structure 166 which is positioned over the end of the module structure 161. The frame like structure 166 is generally quadrilateral in configuration having a pair of upstanding supports or legs and a pair of laterally extending elements which interconnect with the upstanding supports to form the frame.

Figure 21:
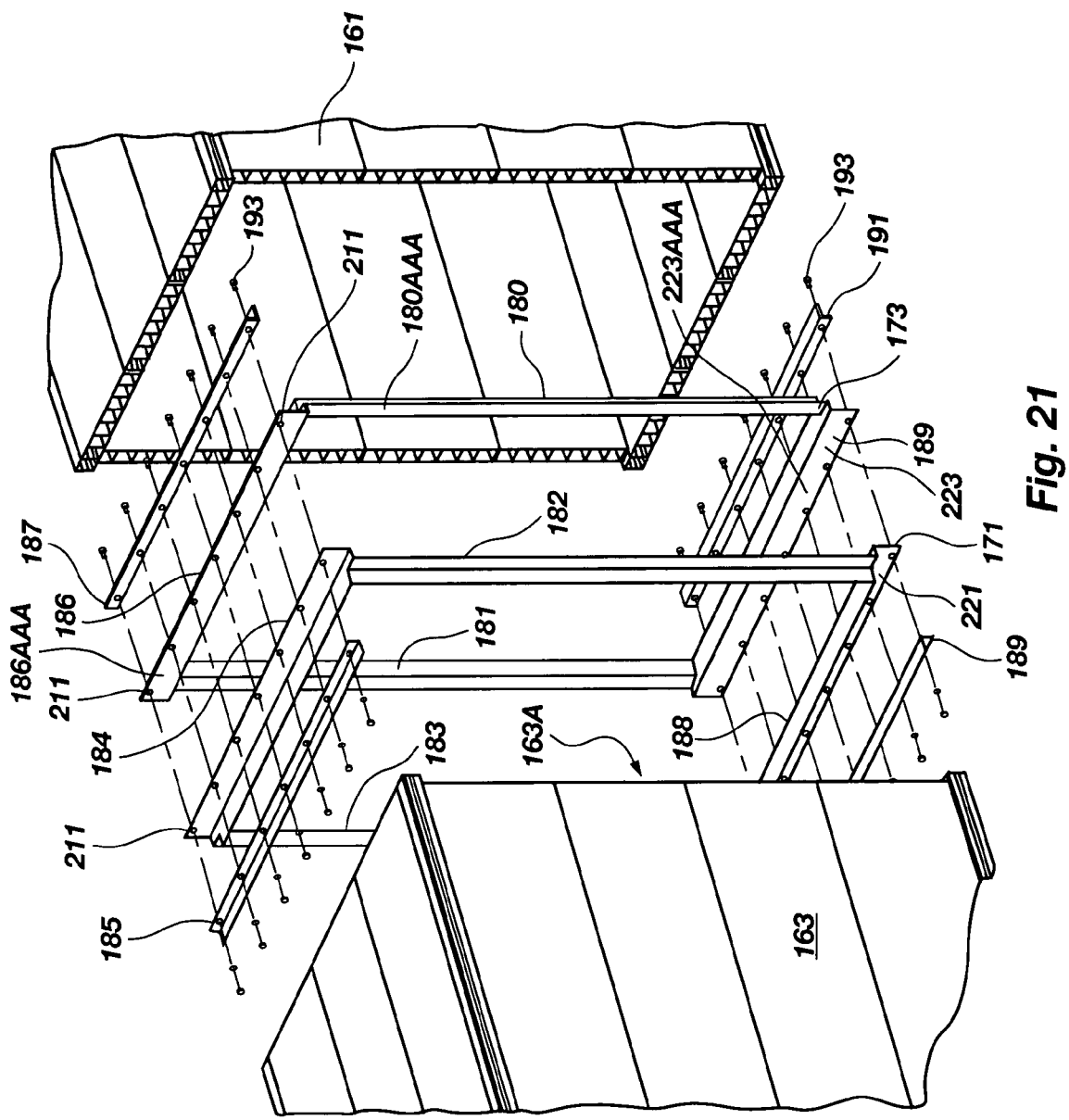
FIG. 21 is an exploded perspective view of a connection assembly of two modular sections of a pasageway.

As illustrated in FIG. 21 in more detail, the connection structure 165 includes two frame like elements 171 and 173. Each of these frame elements is generally quadrilateral in configuration and define a central passageway therethrough. The frame elements are respectively formed by a pair of upstanding elements (180, 181) and (182, 183) in association with a pair of laterally extending elements (186, 189) and (184, 188). The upstanding elements are connected respectively on each of their ends with a corresponding laterally extending element to form the frames as illustrated.

The frame elements will now be described with reference to frame element 171. It should be understood that frame element 173 is a mirror image of frame element 171. As shown to advantage in FIG. 23, frame element 171 includes two upstanding members 182 and 183. These two upstanding members are oriented parallel and spacedly apart from one another. Each upstanding member is formed of two planar panels. For example, upstanding member 182 is formed of panel 182A and 182B. These two panels are conjoined to one another along an upright edge of each of the two panels. In preferred constructions, the two panels are conjoined to define a ninety degree angle 191 between the respective planes of the two panels. Panel 182B defines an inner face and an outer face. The outer face 182BB is planar and is configured to be abutted against the inner surface of a passageway of section 163 and be adhered thereto. Panel 182A also defines two surfaces. The surface 182AA is configured to be abutted against the end surface 163A of the passageway section 163 to cover the open end of the various panels which together constitute the upstanding sidewall of that section. As shown in FIG. 21 the end of a passageway section, notably section 161 in FIG. 21, is open. The various open compartments within each of the modular panel sections are open to view. The face 182AA of the upstanding member 182 is configured to be placed over the right sidewall of the module 163 to cover and thereby seal the openings of the various compartments. The face 182AA may be adhered to the end portion of section 163 by use of adhesives. Upstanding member 183 is constructed similarly to upstanding member 182 in that it has two panels with each of these panels configured with faces adapted to be adhered to the inner surface of the sidewall and the open end of the sidewall of module section 163.

Figure 24:
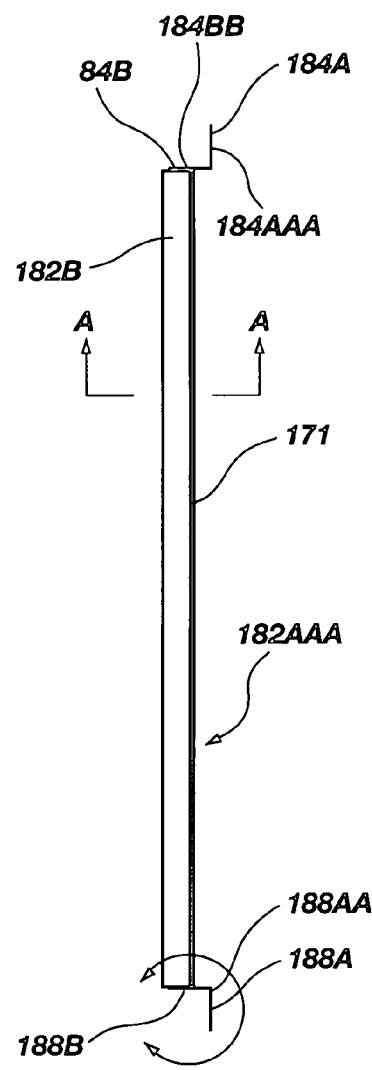
FIG. 24 is a side view of the component element of FIG. 23.
Figure 25:
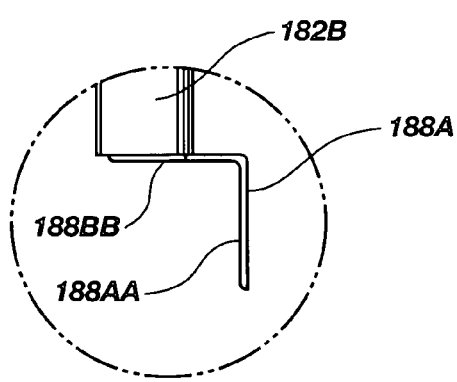
FIG. 25 is a sectional view of the component element of FIG. 24.

The panel 182A of upstanding element 182, as shown in FIG. 24, also defines a face 182AAA which faces outwardly away from the modular section 163. This face 182AAA is planar in configuration and is adapted to abut against and be secured to an elongate upstanding connection strip 243 which is interposed intermediate upstanding frame member 182 and upstanding member 180.

The frame element 171 includes two laterally extending members 184 and 188. As shown to advantage in FIG. 23, lateral member 184 includes two panels 184A and 184B. These two panels are planar in configuration and are conjoined to one another along a laterally extending edge to define a ninety degree angle 193 between the planes of the two panels. The panel 184B defines a face 184BB which is planar in configuration and adapted to abut against and be secured to the inner sidewall surface of the ceiling of the modular section 163. Similarly, the panel 184A defines a face 184AA which is planar and is adapted to be abutted against and adhered to the end of the ceiling of the modular section 163 to thereby seal the open end of that ceiling. The panel 184A also defines a face 184AAA which is planar in configuration. This particular face is configured to abut against and be interconnected to face 186AAA of lateral member 186 of frame element 173. The lateral member 184 defines a plurality of apertures 211 therein which are spacedly positioned along the length of the member 184. These apertures are dimensioned to receive and retain connection members such as rivets, bolts, or screws which pass through the apertures and corresponding apertures in lateral member 186.

The lateral member 188 is constructed similarly to lateral member 184. It too is formed of two panels which are configured to abut against and be adhered to the upper surface of the floor element and the open end of the floor element of the module 163. Similarly, the surface 188AAA is formed to be planar in configuration to facilitate its abutment and conjuncture with its counterpart surface 223AAA. In effect, the lateral member 188 is a mirror image of lateral member 184 about a horizontal axis.

Figure 22:
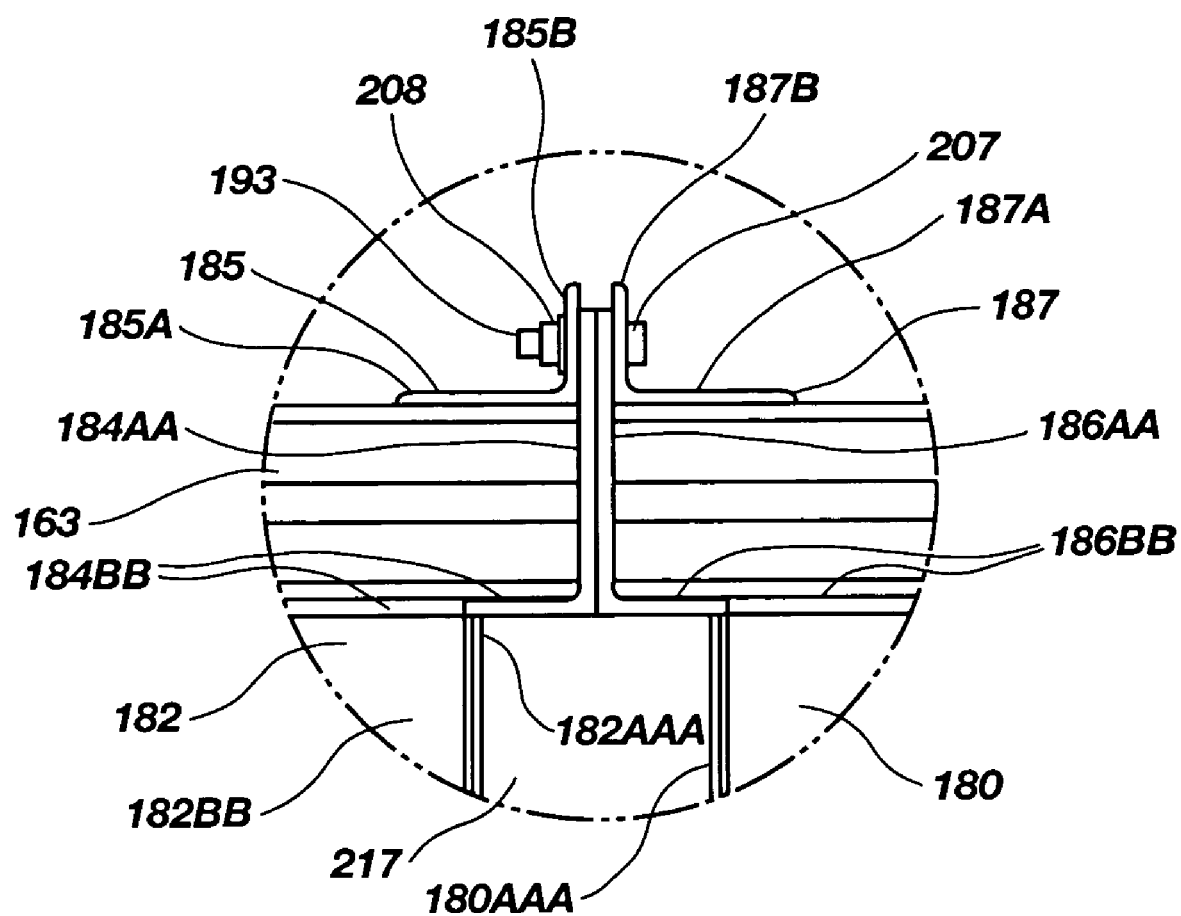
FIG. 22 is a sectional side view of the connection assembly of FIG. 21.
Figure 23:
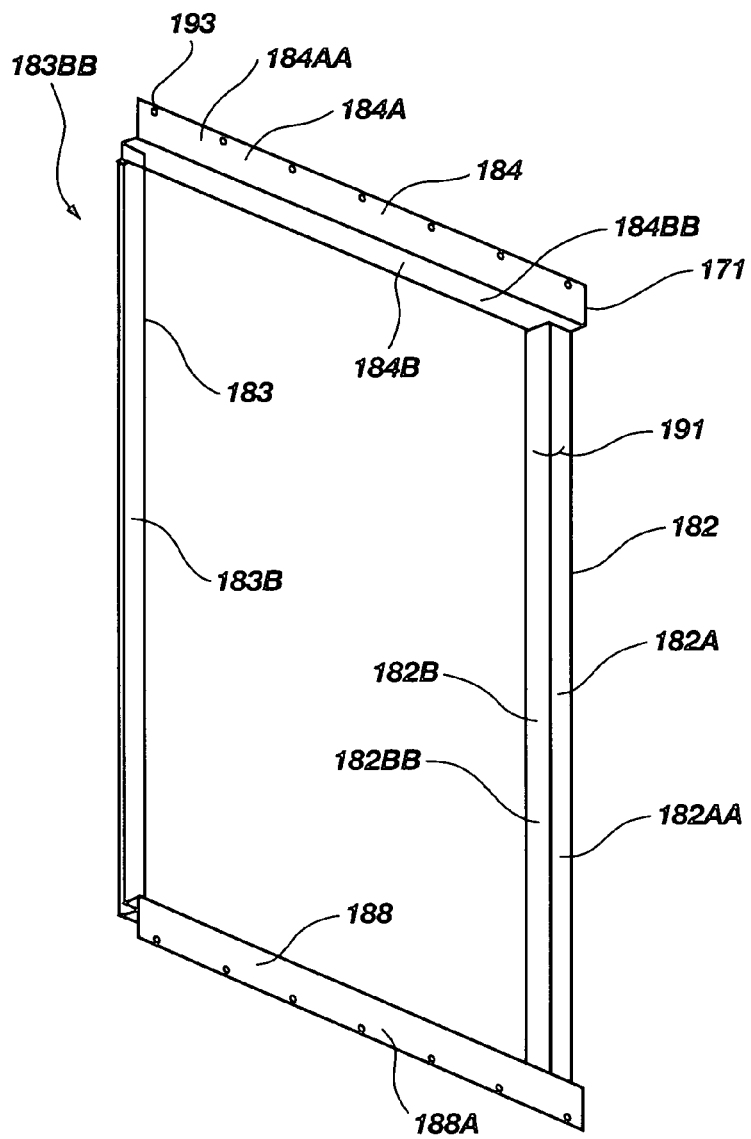
FIG. 23 is a perspective component element of a connection assembly.

As shown in FIG. 22, the frame 171 is slid into the passageway of section 163 to bring the faces 184AA and 182BB into abutment against the inner surfaces of the passageway of section 163. It should be understood that faces 183BB and 188AA are equally brought into a similar abutment. The aforesaid surfaces may be coated with adhesive prior to their being brought into abutment against the inner surfaces of the section 163 in order to produce a strong union of the frame member 171 and the section 163. As shown to advantage in FIG. 22. Similarly, the frame member 173 is inserted into the passageway of section 161 and joined thereto. Subsequently the two section 161 and 163 are abutted against one another as shown in FIG. 19 thereby bringing the faces 186AAA and 184AAA as well as 188AAA and 223AAA respectively into abutment. The two frames 171 and 173 are thereafter joined to one another. The frames may be welded to one another, adhered to one another or mechanically joined to one another. By joining the two frames together the two sections 161 and 163 are joined together as well in view of the interconnection of each frame to its respective section.

FIG. 21 illustrates a means of further strengthening the connection between the two frames 171 and 173. As shown, a pair of supplemental supports 185 and 187 may be positioned on the upper exterior surface of the two modular sections 161 and 163. As shown each of these supplemental supports is formed of a pair of planar panels conjoined along a lateral edge to form an angle defining structure having a first planar panel 185A connected to a respective second planar panel 185B, to form a ninety degree angle there between. Similarly, supplemental support 187 if formed of a panel 187A conjoined to a panel 187B. The planar panels 185B and 187B define apertures 208 and 207 respectively which extend through the complete thickness of each panel. The apertures facilitate the use of the engagement structure 193, which is shown as a bolt in association with a nut. The bolt passes through the apertures in the two supplemental supports and the apertures 211 in the panels 186 and 184 and is then fitted with a nut to secure the assembly.

The downwardly oriented surface of each of the first panels 185A, 187A is planar and is adapted to be adhered to the exterior upper surface of its respective module 163, 161.

Each of the lower laterally support elements 188, 189 also are defined by two planar panel members which are constructed, oriented and secured to their respective modules substantially in mirror image to the upper laterally supports 185 and 187.

In the construction shown, the faces 182AAA and 180AAA and similarly 183AAA and 181AAA are spacedly positioned from one another when the two frames are brought into abutment. In order to seal the interior passageway from the elements, a sealing strip 217 is positioned between faces 182AAA and 180AAA. A counter part sealing strip is also positioned between the faces 183AAA and 181AAA. This sealing strip may be formed of a planar panel with suitable connection structure to retain it in place.

The use of the two frame elements 171 and 173 and their associated supports 185, 187, 189 and 191 provides a means of conjoining two adjacently positioned modular sections of the passageway. A similar connection structure may be formed between the adjacently positioned ends of further modular sections to create a passageway of any desired length. It is contemplated that the connection structure may be suitably modified to provide a juncture between modular sections which intersect on other than a linear orientation. For example, in FIG. 18 a connection 165A between a section 170 and 172 is illustrated wherein the two sections define an angle 180 between the respective longitudinal axes of those sections. By adjusting the angles of the two panels forming the upright elements of the frames 171 and 173 it is anticipated that a connection structure suitable for conjoining two such sections 170 and 172 may be created.

Characteristics of the described and illustrated embodiments are intended for illustrative purposes and are not to be considered limiting or restrictive. It is to be understood that various adaptations and modifications may be made by those skilled in the art to the embodiments illustrated herein, without departing from the spirit and scope of the invention, as defined by the following claims thereof.

What is claimed is:

1. In a boarding bridge, a passageway which defines a pathway for travel between an aircraft terminal and a docked aircraft, wherein the improvement in said passageway comprises:
   a floor element;
   two wall elements positioned atop said floor element, said wall elements being positioned spacedly apart from one another and extending uprightly from said floor element;
   a ceiling element positioned atop said two wall elements;
   wherein said floor element, said wall elements and said ceiling element are fabricated from at least one pultruded panel
   wherein said wall elements are each fabricated from a plurality of pultruded panels, each of said pultruded panels defining a honeycomb cross-section and having a longitudinal axis, said longitudinal axes of said plurality of pultruded panels of said wall elements being oriented orthogonal to a longitudinal axis of said passageway.

2. The passageway of claim 1 wherein said at least one pultruded panel defines a honeycomb cross section and at least one elongate channel therein dimensioned to receive and retain wiring for servicing said passageway.

3. The passageway of claim 1 wherein said floor element, said wall elements and said ceiling element are each fabricated from a plurality of pultruded panels, each of said pultruded panels defining a honeycomb cross-section and having a longitudinal axis, said longitudinal axes of said pultruded panels being oriented perpendicular to said longitudinal axis of said passageway.

4. The passageway of claim 1 wherein said ceiling element is fabricated from a plurality of pultruded panels, each of said pultruded panels having a longitudinal axis, said longitudinal axes of said pultruded panels of said ceiling element being oriented orthogonal to said longitudinal axis of said passageway.

5. A passageway for placement between an aircraft terminal and an aircraft for interconnecting said aircraft terminal with said aircraft, wherein the improvement in said passageway comprises:
   a plurality of passageway modules, each module comprising:
      a floor element;
      two wall elements positioned atop said floor element, said wall elements being positioned spacedly apart from one another and extending uprightly from said floor element;
      a ceiling element positioned atop said two wall elements;
      wherein said floor element, said wall elements and said ceiling element are fabricated from at least one pultruded panel defining a honeycomb cross section; and
   connection structure for fixedly interconnecting adjacent said modules, one to another at their respective ends, to form a continuous passageway, said connection structure mechanically interconnecting said ceiling elements of adjacently positioned modules to one another and further mechanically interconnecting said floor elements of adjacently positioned modules to one another.

6. The passageway of claim 5 wherein said connection structure comprises:
   a pair of horizontally oriented first frame structures positioned in abutment against one another, each said first frame structure having an upwardly extending ear, each said first frame structure being secured to said ceiling element of a respective said module;

a pair of horizontally oriented second frame structures positioned in abutment against one another, each said second frame structure having a downwardly extending ear, each said second frame structure being secured to said floor element of a respective said module;

a first pair of first connection elements, each said first connection elements being secured to said ceiling element of a said respective module for inter-cooperating with said upwardly extending ear ears and forming a union of said two ceiling elements of said modules;

a second pair of angle defining elongate second connection elements, each said second connection elements being secure to said floor element of a respective module for inter-cooperating with said downwardly extending ears and forming a union of said two floor elements of said modules; and engaging structure for interconnecting said first pair of first connection elements with said pair of first frame structures and for interconnecting said second pair of second connection elements with said pair of second frame structures.

7. The passageway of claim 6 wherein each said first frame structure is connected to a respective second frame structure by a pair of vertically oriented third frame structures, each said vertically oriented third frame structure being secured at one end thereof to a said first frame structure and being secured at an opposing end thereof to a said second frame structure wherein an association of a said first frame structure, a said second frame structure and said pair of third frame structures defines a quadrilaterally configured frame which defines a passageway opening therethrough.

8. The passageway of claim 6 wherein said engaging structure comprises a nut and bolt combination.

9. The passageway of claim 6 wherein each said frame includes an engagement surface configured to abut against a surface of said module sufficient to permit an adhesive bond between said engagement surface and said module surface.

10. A passageway for placement between an aircraft terminal and an aircraft for interconnecting said aircraft terminal with said aircraft, said passageway comprised of a plurality of passageway modules, wherein the improvement in each of said passageway module consists essentially of:
a floor element;
two wall elements positioned atop said floor element, said wall elements being positioned spacedly apart from one another and extending uprightly from said floor element;
a ceiling element positioned atop said two wall elements;
wherein said floor element, said wall elements and said ceiling element are fabricated from at least one pultruded panel defining a honeycomb cross section; and connection structure for interconnecting said modules, one to another at their respective ends to form a continuous passageway, wherein said connection structure further comprises a pair of frame structures, said frame structures having an upwardly extending ear and a downwardly extending ear; a first pair of angle defining elongate connection elements for inter-cooperating with said upwardly extending ear and two ceiling elements of said modules; a second pair of angle defining elongate connection elements for inter-cooperating with said downwardly extending ear and two floor elements of said modules; and engaging structure for interconnecting said first pair of angle defining elongate connection elements with said pair of frame structures and for interconnecting said second pair of angle defining elongate connection elements with said pair of frame structures;

wherein said wall elements are each fabricated from a plurality of pultruded panels, each of said pultruded panels defining a honeycomb cross-section and having a longitudinal axis, said longitudinal axes of said pultruded panels of said wall elements being oriented orthogonal to a longitudinal axis of said passageway.

11. The passageway of claim 10 wherein said frames are quadrilateral in configuration and wherein each said frame defines a passageway opening therethrough.

12. The passageway of claim 10 wherein each said frame includes an engagement surface configured to abut against a surface of said module sufficient to permit an adhesive bond between said engagement surface and said module surface.

13. The passageway of claim 11 wherein said at least one pultruded panel defines a honeycomb cross section and at least one elongate channel therein dimensioned to receive and retain wiring for servicing said passageway.

14. The passageway of claim 13 wherein said floor element, said wall elements and said ceiling element are each fabricated from a plurality of pultruded panels, each of said pultruded panels defining a honeycomb cross-section and having a longitudinal axis, said longitudinal axes of said pultruded panels being oriented parallel to a longitudinal axis of said passageway.

15. The passageway of claim 10 wherein said ceiling element is fabricated from a plurality of pultruded panels, each of said pultruded panels having a longitudinal axis, said longitudinal axes of said pultruded panels of said ceiling element being oriented orthogonal to said longitudinal axis of said passageway.

* * * * *